US008343603B2

(12) United States Patent
Negle

(10) Patent No.: US 8,343,603 B2
(45) Date of Patent: Jan. 1, 2013

(54) INSULATOR MATERIAL AND METHOD FOR MANUFACTURING THEREOF

(75) Inventor: Hans Negle, Nahe (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 522 days.

(21) Appl. No.: 12/530,798

(22) PCT Filed: Mar. 10, 2008

(86) PCT No.: PCT/IB2008/050863

§ 371 (c)(1),
(2), (4) Date: Jan. 25, 2010

(87) PCT Pub. No.: WO2008/110979

PCT Pub. Date: Sep. 18, 2008

(65) Prior Publication Data

US 2010/0139951 A1 Jun. 10, 2010

(30) Foreign Application Priority Data

Mar. 13, 2007 (EP) .................................... 07104039

(51) Int. Cl.
*B29D 22/00* (2006.01)

(52) U.S. Cl. .................................. 428/36.5; 174/137 R

(58) Field of Classification Search .................. 428/402, 428/36.5; 174/137 R
See application file for complete search history.

(56) References Cited

U.S. PATENT DOCUMENTS

| | | | | |
|---|---|---|---|---|
| 4,543,207 | A * | 9/1985 | Sato et al. | 252/570 |
| 5,756,936 | A * | 5/1998 | Viebranz et al. | 174/73.1 |
| 6,432,524 | B1 * | 8/2002 | Fromm et al. | 428/313.3 |
| 2010/0139951 | A1 * | 6/2010 | Negle | 174/137 R |

FOREIGN PATENT DOCUMENTS

| | | |
|---|---|---|
| DE | 4209381 | 10/1992 |
| EP | 1176856 | 7/2001 |
| EP | 1575061 | 2/2005 |
| WO | WO2004112055 | 12/2004 |

* cited by examiner

*Primary Examiner* — N. Edwards

(57) ABSTRACT

Vacuum filled hollow alveoles embedded in an insulation material in order to arrive at a light weight insulation material using the high breakdown voltage of evacuated cavities, i.e. alveoles at a vacuum lower than the minimum of the Paschen law. Pressurized hollow alveoles embedded in an insulation material in order to arrive at a light weight insulation material using the high breakdown voltage of pressurized cavities, i.e. alveoles at a pressure higher than the minimum of the Paschen law.

13 Claims, 4 Drawing Sheets

INSULATOR MATERIAL AND METHOD FOR MANUFACTURING THEREOF

FIELD OF THE INVENTION

The present invention relates to an insulator material, an insulator device, a method for manufacturing of the insulator material and the insulator device and to an alveole for being embedded into the insulator material, and in particular to an insulator material and an insulator device as well as a method for manufacturing thereof, which allows to provide an improved light weight insulator material and insulator device.

BACKGROUND OF THE INVENTION

In particular applications, there is a need for an insulator material, which is of a light weight, in particular when exposed to a high acceleration, for example in computer tomography devices, in which the high voltage parts are rotating in a high speed, which results in a high radial acceleration of the components. Therefore, there is a need for a light weight material in order to reduce the moved masses in order to reduce the forces due to a high radial acceleration. From EP 1 176 856, it is known that for a solid high voltage insulation material, e.g. based on epoxy resin, which shall have a low weight, hollow micro-spheres are used as a sort of filler. For an optimal high voltage construction it is necessary to balance the design parameters of these hollow micro-spheres. To get the lowest weight by a given material of the micro-spheres, e.g. glass, it would be useful to realise relative large hollow micro-spheres with a thin wall thickness to get the lowest overall weight when these micro-spheres were put into the epoxy resin as a filler together with the hardener and other ingredients like coupling agents, etc.

However, the diameter of the micro-spheres influence the dielectric strength in such a way that the larger the diameter is, the lower is the electric strength owing to partial discharges (PDs), which occur in gaseous enclosures inside of a solid material due to an increased electrical field within the gaseous spaces in form of gas filled hollow micro-spheres. These partial discharges start from a certain ignition voltage onwards, which depends on the gas pressure at the acceleration gap within the hollow micro-sphere to start an ionisation process which leads to an electron avalanche hitting the inner surface of the micro-sphere. This process is well known from the theory as partial discharge process. From a certain energy over a certain time onwards, this electrical erosion process caused by partial discharges destroys first the wall of the, e.g. glass of the hollow micro-spheres, depending on the wall thickness and next the surrounding epoxy resin matrix resulting in a total breakdown of the insulation material. These effects are also known from other solid insulation materials, for example, for high voltage power cables having a polymer insulation material.

To prevent these partial discharges, the diameter and by this, the acceleration gap, within the hollow micro-spheres has to be reduced to such an amount that no partial discharges may occur. Since the hollow micro-spheres are nominally filled with a gas like, for example, air, $N_2$, $CO_2$, $SO_2$, which depends on the production process, the so-called Paschen law is valid for calculating the ignition voltage for the partial discharge. The ignition voltage is for small acceleration gaps and low pressure inverse proportional to the gas pressure p multiplied by the acceleration gap distance d, wherein the acceleration gap corresponds to the diameter of the hollow spheres.

That means that either the pressure or the diameter has to be made to zero to get the highest ignition voltage for preventing the partial discharge. The ignition voltage has to be higher than the nominal voltage which is put from the overall construction divided by the inner voltage dividers to the specific micro-spheres, which corresponds to the theory of partial discharge breakdown.

Reducing the diameter means that the relation of the wall thickness to the gas filled volume becomes worse and by that the weight of the total hybrid material comes up.

SUMMARY OF THE INVENTION

In view of the above, it may be seen as an object of the invention to provide a high voltage insulating material which has sufficient properties with respect to weight and dielectric strength.

The object of the present invention is solved by the subject matter of the independent claims, wherein advantageous embodiments are incorporated in the dependent claims.

According to an exemplary embodiment of the invention, there is provided an alveole having a wall enclosing a cavity, wherein the wall of the alveole comprises pores in a size allowing a gas molecule to pass of the wall of the alveole and hindering a polymer molecule to pass from the outer to the inner of the alveole.

Using an alveole having a porous wall structure, having pores with a diameter that gas molecules like air, $N_2$, $CO_2$, $SO_2$ can pass through, and being small enough that polymer chains of a typical thermo setting material like, for example, epoxy resin and their hardener components cannot pass through, these alveoles may be used as a filler within an insulation material. It is possible to evacuate the alveoles so that the gas within the alveoles may escape from the cavity of the alveole, and at the same time to avoid the entering of polymer molecules to maintain the vacuum in the alveole.

According to an exemplary embodiment of the invention, the alveole has pores having a size allowing gas molecules to pass from the inner to the outer of the alveole, wherein the gas molecules are out of a group consisting of $N_2$, $CO_2$ and $SO_2$.

It should be noted that the mentioned molecules of the gases are given only for purposes of defining the diameter of the pores in the wall of the alveole, in particular since the above gases occur in producing alveoles like hollow glass spheres. The alveoles may also have pores which are capable of letting pass other gas molecules, in particular those gas molecules, which occur in manufacturing hollow alveoles. It should be noted that the alveole may be considered as a structure of an open porous foam having a plurality of sub-cavities and that the quantity of the size of the pores is dimensioned considering the effective cross section of the respective gas molecules. An evacuation process may be considered in analogy to a diffusion through a membrane. The cross section of the pore may depend on the kind of gas molecule as well as the temperature. I.e., although the geometrical diameter of the gas molecule may for example smaller than 1 nm (nanometer) (the diameter of a $N_2$-molecule for example is about 0.31 nm and the diameter of an $O_2$-molecule is about 0.36 nm), the effective cross section of the molecule may be much larger. Thus, the geometrical size of the pores must be designed larger than the geometrical diameter of the respective molecule so that the pores allow a gas molecule to pass. An appropriate design of the pore size is carried out by the skilled person considering the actual requirements.

According to an exemplary embodiment of the invention, the pores having a size hindering polymer molecules to pass from the outer to the inner of the alveole, the polymer molecules are out of a group of materials comprising epoxy resin and/or polyester resin and corresponding hardener component, silicone rubber, thermo setting material, thermo plastic material, silicone oil and/or mineral oil.

It should be noted that also irregular chains of polymers like those of mineral oils may be considered as polymer molecules with respect to the present invention. Further, also very short polymer molecules should be considered, like the construction of only a few monomeric cells.

According to an exemplary embodiment of the invention, the wall of the alveole is formed of a material out of a group of materials, which materials comprise glass, ceramic, phenolic resin and/or acrylonitrile co-polymer.

Those materials provide good properties for the design of a porous wall structure for alveoles, and allow to provide the possibility for gas molecules to pass the pores.

According to an exemplary embodiment of the invention, the alveoles substantially have a shape in form of spheres or a shape in form ellipsoids. Spheres and ellipsoids provide good properties with respect to the geometry of high field applications. Further, it should be noted that the cavity within the alveoles may be of an open porous structure having a plurality of sub-cavities. However, also any other outer shaped alveoles may be used.

According to an exemplary embodiment of the invention, the alveoles have a diameter of 5 μm (micrometer) to 500 μm, preferably 10 μm to 200 μm and more preferably 80 μm to 160 μm.

With alveoles e.g. spheres or ellipsoids having such diameters, it is possible to apply a vacuum, which is suitable for reducing the electrical breakdown in the cavity of an alveole and, at the same time, to reduce the total weight of an insulator having included the alveoles as a filler. The wall of the alveole may have a thickness of about 0.5 μm to 5 μm, preferably 1 μm to 2 μm.

According to an exemplary embodiment of the invention, there is provided an insulator material comprising a matrix material and a plurality of alveoles, which alveoles are evacuated at a pressure lower than the pressure which corresponds to the minimum of the Paschen law.

According to an exemplary embodiment of the invention the pressure is equal or lower than the pressure which corresponds to the pressure in the Paschen law expressing a breakdown voltage which is twice of the breakdown voltage of the minimum of the Paschen law.

As a matter of fact, the skilled person would select an appropriate vacuum with respect to the desired breakdown voltage.

The Paschen law describes the relation between a breakdown voltage and the product of the pressure and the diameter of a gap. According to the Paschen law, the breakdown voltage increases if the product of the pressure and the diameter is very low or if the product of the diameter and the pressure is very high. In between, the breakdown voltage has a minimum. Therefore, when providing a gap with a constant diameter, to increase the breakdown voltage, the pressure must be very high or very low. To increase the breakdown voltage, often a pressure is used, which is higher than the pressure which corresponds to the minimum of the Paschen law. However, according the present invention, the alveoles are evacuated to arrive at the range of the Paschen law curve, which corresponds to a pressure lower than the pressure which corresponds to the minimum of the Paschen law. Thus, no particular gases like sulphur hexafluoride SF6 leading to a negative greenhouse effect needed to be used for filling the alveoles, moreover, by applying a vacuum of an appropriate pressure, a similar effect may be achieved with evacuated alveoles.

According to an exemplary embodiment, the alveoles to be used in the insulator material are alveoles having a wall enclosing a cavity, wherein the wall of the alveole comprises pores in a size allowing a gas molecule to pass from the inner to the outer of the alveole and hindering a polymer molecule to pass from the outer to the inner of the alveole, as it is described above.

Thus, the alveoles may be mixed with a matrix material and may be evacuated thereafter, since the pores of the alveoles allow a gas to escape and hinder larger polymer molecules to enter from the outer of the alveole to the inner thereof. The matrix material should have an appropriate viscosity allowing the generated gas bubbles to escape from the mixing material.

According to an exemplary embodiment, the matrix material is a material out of a group of materials, which materials comprising epoxy resin and/or polyester resin and corresponding hardener component, silicone rubber, thermo setting material, thermo plastic material, silicone oil and/or mineral oil.

Those materials have good properties with respect to high electric field strength and therefore, may be used as a matrix material embedding the alveoles as a filler material. Since these materials are at least temporarily fluid, these materials may allow a gas being included in the alveoles to escape under an applied vacuum in order to provide evacuated alveoles. However, also any other high voltage insulation material may be used, in particular insulating gases like SF6.

According to an exemplary embodiment, the pressure of the alveoles is between 5×10 exp (−1) mbar and 5×10 exp (−2) mbar.

With the appropriate size of alveoles, these pressure provides a sufficient vacuum to maintain the breakdown voltage high with respect to the Paschen law and the Paschen curve, respectively.

According to an exemplary embodiment, the pressure is higher than the vapour pressure of the matrix material.

Thus, the liquid solvent components of the matrix material may be prevented from being vaporised, which would lead to a malfunction of the matrix material.

According to an exemplary embodiment of the invention, the pressure is higher than a pressure, at which components of a matrix material dissociate from each other.

Thus, the matrix material may be kept in an appropriate condition without destroying the structure by means of a dissociation of the matrix material or components thereof.

According to an exemplary embodiment of the invention, the pressure is equal or lower than the pressure which corresponds to the pressure in the Paschen law expressing the breakdown voltage which corresponds to the breakdown voltage of the matrix material.

Thus, the breakdown strength in the insulator material may be kept constant irrespective of the locations of the matrix material or the evacuated alveoles. In particular, with such a vacuum, a maximum dielectric strength of the insulator material may be provided without the risk of partial discharges.

According to an exemplary embodiment of the invention, the insulation material is fluid. Thus, it is further possible to move the insulator material during operation in order to conduct heat or in order to filter the insulation material during operation.

According to an exemplary embodiment of the invention, the insulation material is solid.

Thus, a fibre breakdown due to an accumulation of contamination material may be avoided. It should be noted that also rubber material is considered as solid material.

According to an exemplary embodiment of the invention, the volume ratio between the alveoles and the insulation material is between 40% and 74%, in particular between 60% and 68%.

The higher the volume ratio, the lighter the insulator material. The hexagonal highest density of equally sized spheres is about 74%, however, when using alveoles of different sizes, the volume ratio may also be higher than 74%.

According to an exemplary embodiment of the invention, there is provided an insulator device having a predetermined form represented by an outer shape, which outer shape is filled with an insulator material comprising a matrix material and a plurality of alveoles, which alveoles are evacuated at a pressure lower than the pressure which corresponds to the minimum of the Paschen law.

Thus, it is possible to provide an insulator device having a particular form made out of the inventive insulator material, as it is described in detail above.

According to an exemplary embodiment of the invention, the insulator material is solid and the outer shape is the surface of the solid insulator material.

This means that the insulator device may be manufactured as a cast body, an injection moulding body or a machined body out of a full material.

According to an exemplary embodiment, the outer shape is given by an outer shell forming a cavity, which cavity is filled with the insulator material, which insulator material is fluid or gaseous.

Thus, an insulator device having a predetermined form may be provided also with a fluid insulating material, for example to provide a fluid movement in order to provide a heat transfer. The matrix material may also be gaseous, e.g. an insulation gas like SF6, which provides a light weight insulation arrangement. Selecting a high volume ratio of the alveoles, irrespective whether the matrix material is fluid or gaseous, a heat convection may be avoided, due to the high package density of the alveoles hindering a fluid or gas to move by convection.

According to an exemplary embodiment of the invention, the insulator material is adapted to be solidified.

Thus, also insulator materials may be applied which are liquid or fluid during manufacturing, however solidify after a pre-determined time to provide a solid insulator device. A solid or solidified insulator may not only serve as an insulator, but also as a mechanical support.

According to an exemplary embodiment of the invention, the outer shell is made of a vacuum tight material with respect to an outer air atmosphere.

Thus, it is possible to keep away external air atmosphere from the insulation material, in order to maintain the vacuum within the alveoles, in particular in case the matrix material is not capable of maintaining the vacuum over a long time period of several years or decades. It may be avoided to let enter the outer air into the structure of the insulation material.

According to an exemplary embodiment, the insulator device is adapted to be used in a rotating gantry of a computer tomography.

For this purpose, the insulator device may be, for example, designed to have no moveable parts, which may move under a high centrifugal force during operation of a rotating gantry of a computer tomography. The acceleration effecting parts on a rotating gantry may be in the range of some 10 of the normal gravity. A sufficient high package density of the alveoles in a fluid or gaseous matrix material avoids movement of the alveoles under centrifugal forces or accelerations.

According to the exemplary embodiment of the invention, there is provided a computer tomography having included an insulator device according to the present invention.

According to an exemplary embodiment of the invention, there is provided a method for manufacturing an insulator material comprising mixing a matrix material and a plurality of alveoles, which alveoles are evacuated at a pressure lower than the pressure which corresponds to the minimum of the Paschen law.

Thus, an insulation material may be provided having good properties with respect to weight and dielectric strength.

According to an exemplary embodiment of the invention, the alveoles are alveoles having a wall enclosing a cavity, wherein the wall of the alveole comprises pores in a size allowing a gas molecule to pass from the inner to the outer of the alveole and hindering a polymer molecule to pass from the outer to the inner of the alveole.

According to an exemplary embodiment of the invention, the alveoles are evacuated before being mixed with the matrix material.

This is useful, for example, if the matrix material has a low viscosity, and therefore does not allow an evacuation after having embedded the alveoles into the matrix material.

According to an exemplary embodiment of the invention, the alveoles are evacuated after being mixed with the matrix material.

Thus, the matrix material may be used not only as the matrix material, but also as a sealing material for sealing the pores of the alveoles after having evacuated the alveoles. The gas within the alveoles may escape and rise in the matrix material, if the viscosity of the matrix material allows a movement of the gas bubbles.

According to an exemplary embodiment of the invention, a first quantity of the alveoles is mixed with an epoxy resin, and a second quantity of the alveoles is mixed with a corresponding hardener component before the epoxy resin and the corresponding hardener component are mixed.

Thus, time may be saved during the manufacturing process, in particular, time used for the setting and hardening of the epoxy resin. Thus, the time necessary for mixing the alveoles into the epoxy resin and the hardener component, respectively, does not need to be provided during the mixing and setting phase of the epoxy resin.

According to an exemplary embodiment of the invention, the hardening of the epoxy resin takes place at the pressure corresponding to the internal pressure of the evacuated alveoles.

Thus, even if the pores of the alveoles should be large, i.e. as large as polymeric chains may enter the cavity of the alveoles, the outer vacuum pressure keeps the matrix material away from the pore openings of the alveo les during the setting process, so that after having set the epoxy resin, the polymeric chains would not be flexible in order to enter the cavity of the alveole.

According to an exemplary embodiment of the invention, the pressure is higher than the pressure at which components of the matrix material dissociate from each other.

Thus, a dissociation and a malfunction of the matrix material may be avoided in order to maintain the full reliability with respect to dielectric impact of the matrix material.

According to an exemplary embodiment of the invention, the insulation material is injection moulded under an atmosphere having a pressure corresponding to the internal pressure of the evacuated alveoles.

Thus, it is possible to manufacture an insulation device by means of an injection moulding process and to maintain the cavity of the alveoles free from polymer molecules until the resin has set when finishing the injection moulding process.

It should be noted, that the insulation material and the insulation device may also be used as a thermal insulator.

It should be noted that also any of the above described features may be combined without departing from the present invention.

It may be seen as the gist of the present invention to provide a high voltage insulating material which can be optimised in terms of weight, dielectric strength and mechanical strength in a relatively simple manner by utilising the high breakdown voltage at very low pressures according to the Paschen law.

These and other aspects of the present invention will become apparent from and elucidated with reference to the embodiments described hereinafter.

BRIEF DESCRIPTION OF THE DRAWINGS

Exemplary embodiments of the present invention will be described in the following with reference to the following drawings.

DETAILED DESCRIPTION OF THE EXEMPLARY EMBODIMENTS

Figure 1:
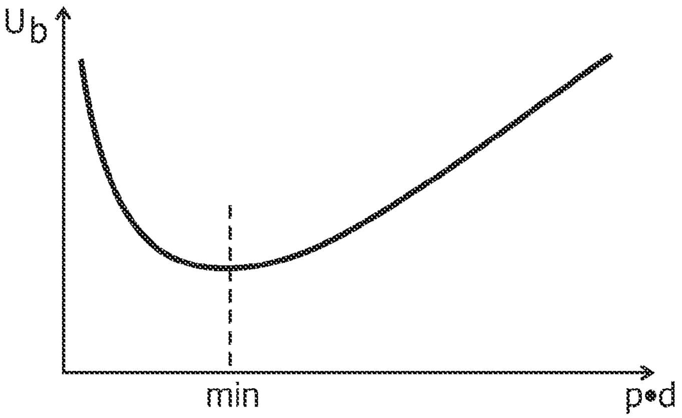
FIG. 1 illustrates the Paschen curve according to the Paschen law.

FIG. 1 illustrates the Paschen curve according to the Paschen law. The Paschen law illustrates the relation between a breakdown voltage Ub and the product of the pressure p and the distance d. According to the Paschen law, the breakdown voltage Ub can be expressed as follows:

$$Ub = \frac{c2pd}{\ln(c1\,pd) - \ln\ln 1/\gamma}$$

Ub is the breakdown voltage, p is the pressure within the geometry, d is the distance between the two electrodes which can be considered as the diameter of, for example, the alveole, γ (gamma) is the third Townsend coefficient representing a material constant, typical values thereof are $\gamma$=0.01 to 0.1; c1 and c2 are material constants representing the material of the gas and the electrodes. According to the Paschen law depicted in FIG. 1, the breakdown voltage depends on the gas, wherein for air the minimum is at about 0.4 Pa×m. For larger pd Ub increases almost linear since the free length of path decreases at higher pressures leading to an increased breakdown voltage.

For smaller pd, there is almost no avalanche effect, since the free length of path is larger than the distance d. At the minimum of the Paschen curve, the free length of path and the distance d is almost equal.

By selecting a pressure within the alveoles being on the left side of the minimum of the Paschen curve, i.e. by providing evacuated alveoles, it is possible to increase the breakdown voltage within the alveoles and to avoid partial discharges, which start from a certain ignition voltage onwards, which depends on the gas pressure and the acceleration gap size. By reducing the pressure within the alveole, the ionisation process and avalanche effect may be reduced, so that hitting the inner surface of the alveole by an electron avalanche may be avoided.

Figure 2:
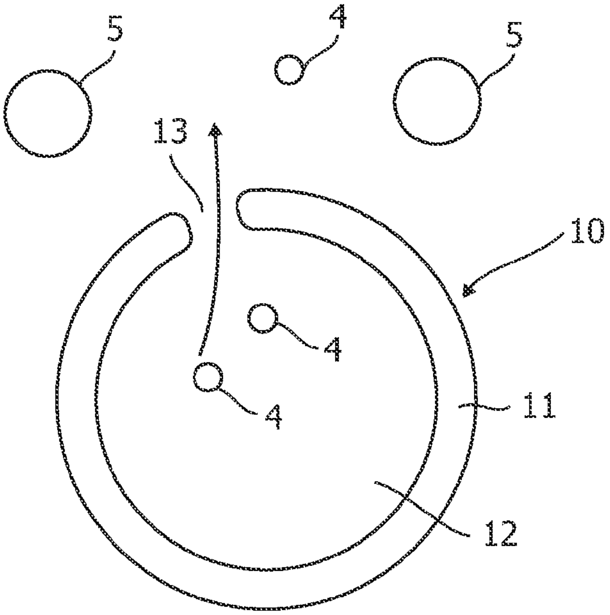
FIG. 2 illustrates an alveole with molecules of two different sizes.

FIG. 2 illustrates an alveole 10 having a wall 11 enclosing a cavity 12, wherein the wall of the alveole comprises pores 13. In FIG. 2, only one pore is illustrated, however, an alveole may also comprise a plurality of pores. The pore 13 is of a size allowing a gas molecule 4 to pass from the inner to the outer of the alveole 10 and hindering a polymer molecule 5 to pass from the outer to the inner of the alveole 10. It should be noted that the molecules normally do not have a spherical structure, and the elements denoted with 4 and 5 in FIG. 2 are illustrated as spheres only for illustration purposes, in order to illustrate that smaller molecules 4 are capable of passing the pore 13, wherein larger molecules like those denoted with 5 may not enter the cavity 12 of the alveole 10. The gas molecules may be out of a group consisting of N2, CO2 and SO2. Those gases are present in the production process of alveoles, in particular hollow glass spheres. On the other hand, the polymer molecules 5 are out of a group of materials comprising epoxy resin and/or polyester resin and corresponding hardener component, silicone resin, thermo setting material, thermo plastic material, silicone oil and/or mineral oil.

It should be noted that the gas molecules may also be gas molecules being larger than the above mentioned, wherein the polymer molecules may also be molecules being smaller than those of the above mentioned materials.

The size of the pores will be determined with respect to the requirements in view of the present gas molecules and the present polymer molecules intended to be used for a matrix material.

The alveole may be formed of a material out of a group comprising glass, ceramic, phenolic resin and/acrylonitrile co-polymer. It should be noted that the alveole may be substantially of a spherical or ellipsoid shape, however, any other outer shape is possible, unless the pore size is in a dimension as outlined above. It also should be noted that the cavity of the alveole may have further sub-cavities. For example, the cavity of the alveole may be an open porous foam, wherein the openings between the sub-cavities have to be at least in the pore size as outlined above, in order to allow particular gas molecules to escape from each of the sub-cavities in order to increase the breakdown voltage according to the Paschen law. Also the sub-cavities may have a shape of a sphere or an ellipsoid, wherein the shape thereof is not limited thereto. In case the sub-cavities have a diameter being sufficiently small with respect to the free length of path, the pressure in the sub cavities may be higher to fall under the Paschen law. I.e., on sufficient small diameters, the sub-cavities do not have to be evacuated to meet the Paschen condition.

The alveoles may have a diameter 5 μm to 500 μm, preferably 10 μm to 200 μm, and more preferably 80 μm to 160 μm. It should be noted that a larger diameter requires a lower pressure of the vacuum, in order to maintain the breakdown voltage high in view of the Paschen law, since the product of the pressure p and the distance d should be maintained constant in order to maintain the required breakdown voltage. Thus, an enlarged diameter or distance d requires an increased pressure p to compensate the enlarged free length of path within the cavity of the alveole. However, the larger the diameter, the better is the ratio between the wall thickness and the diameter, and therefore the relative specific weight of the alveole, which leads to a decreased total weight of the insulation arrangement. It should be noted that the optimum of the diameter of the alveoles will be selected on demand considering the above described relation of the Paschen law.

Figure 3:
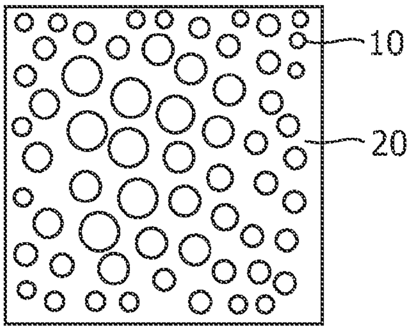
FIG. 3 illustrates a structure of an insulation material having alveoles embedded into a matrix material.

FIG. 3 illustrates an exemplary embodiment of the structure of an insulation material having a plurality of alveoles 10 embedded into a matrix material 20, wherein the alveoles are evacuated at a pressure lower than the pressure which corresponds to the minimum of the Paschen law. It should be noted that the alveoles may be of a different size and further, may have a particular order, which, however, is not mandatory. Alveoles of different sizes may be used in one insulation material.

The alveoles may be alveoles as outlined above, i.e. alveoles having a wall enclosing a cavity, wherein the wall of the alveole comprises pores with the above described size. However, it is also possible to embed alveoles, which are already evacuated.

Figure 4:
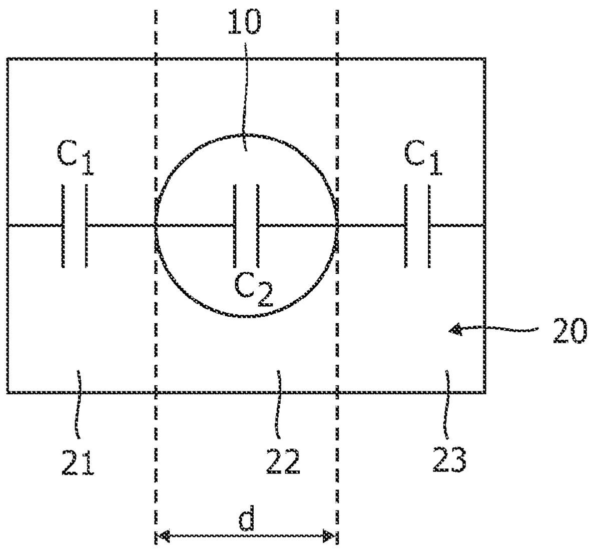
FIG. 4 illustrates the geometry of an alveole in a matrix material and the corresponding capacities.

FIG. 4 illustrates an alveole 10 within a matrix material 20. Further, FIG. 4 illustrates an equivalent circuit of capacitors representing the capacity of a first part of the matrix material 21, a second part of the matrix material 22 enclosing the alveole 10 and a third part of the matrix material 23. Generally, the matrix material has a higher dielectric coefficient than the alveole, which is filled with gas, so that for the capacitors of the equivalent circuit of the matrix material C1 and C3 a higher ∈r (epsilon) is to be considered than that for the equivalent capacitor C2, which dielectric coefficient Er should be about 1 (one) due to the vacuum within the alveole. Due to the continuity of the dielectric displacement density, the electric field strength within the capacitor C2 of the alveole is higher than that of the equivalent capacitors C1 and C3 of the matrix material. Thus, the vacuum within the alveole has a higher electric field strength. Therefore, according to an exemplary embodiment of the invention, the vacuum within the alveole may be of such quality that the alveole 10 resists an electrical field strength which correspond s to the limiting field strength of the matrix material. Therefore, the alveole or alveoles needs to be evacuated to maintain the high dielectric stress during operation.

The matrix material 20 may be of a material out of a group of materials which materials comprising epoxy resin and/or polyester resin and corresponding hardener component, thermo setting material, silicone rubber, thermo plastic material, silicone oil and/or mineral oil. It should be noted that those materials may also be mixed as far as the materials are compatible and the mixture thereof does not lead to a malfunction of the polymer material and the matrix material, respectively. The pressure in the alveole 10 may be, for example, between 5×10 exp (−1) mbar and 5×10 exp (−2) mbar. Further or alternatively, the pressure may be higher than the vapour pressure of the matrix material, since a pressure lower than the vapour pressure of the matrix material will lead to a deterioration and a malfunction of the matrix material, for example, due to a dissociation of particular components thereof.

Further or alternatively, the pressure may also be equal or lower than the pressure which corresponds to the pressure in the Paschen law expressing the breakdown voltage which corresponds to the breakdown voltage of the matrix material, as it is described with respect to FIG. 4 above in greater detail.

The insulation material, i.e. the mixture of the matrix material and the alveoles may be fluid or gaseous, e.g. for providing, for example, an insulating filling of a cavity. The insulation material may also be solid. A solid insulation material may be formed by, for example, epoxy resin and/or polyester resin and corresponding hardener component, silicone rubber or a thermo setting material or thermo plastic material. It should be noted that also a silicone rubber may be achieved by a fluid silicone being mixed with a cross linking agent. A solid insulation material may be a machineable material in order to manufacture particular forms of insulation devices. Further, the insulation material may also be injection moulded in order to achieve a solid insulation device, wherein the insulation material is adapted to solidify after having injection moulded the material.

The volume ratio between the alveoles and the insulation material may be, for example, between 40% and 74%, or in particular between 60% and 68%. Although the hexagonal highest density is about 0.74=74%, it is also possible to achieve a higher volume ratio between the alveoles and the insulation material, since it is possible to provide alveoles of different sizes to also fill the spaces between alveoles being packed in a hexagonal highest density package. Also with other filler materials a higher volume ration may be achieved.

Figure 5:
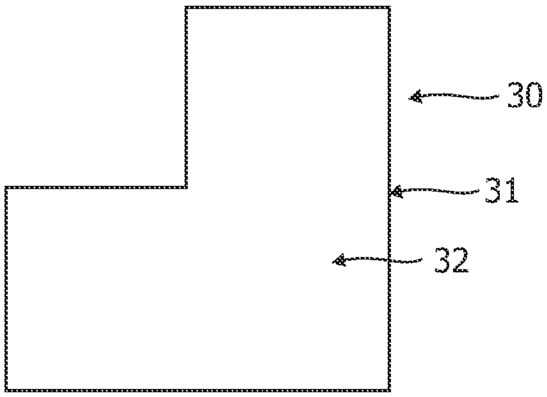
FIG. 5 illustrates a insulation device having an outer shape.

FIG. 5 illustrates an insulator device having a predetermined form represented by an outer shape, which outer shape is filled with an insulator material as it is outlined above. The exemplary embodiment of FIG. 5 illustrates that the insulator material is solid and the outer shape is the surface of the solid insulator material. To maintain the vacuum of the alveoles, in particular alveoles having pores as outlined above, the matrix material may be a vacuum tight matrix material in order to cover the alveoles reliably. This may also be achieved by varnishing the body of the insulator material. However, it is also possible to provide a matrix material which is not vacuum tight, but in this case, the outer shell may be designed as a vacuum tight shell.

Figure 6:
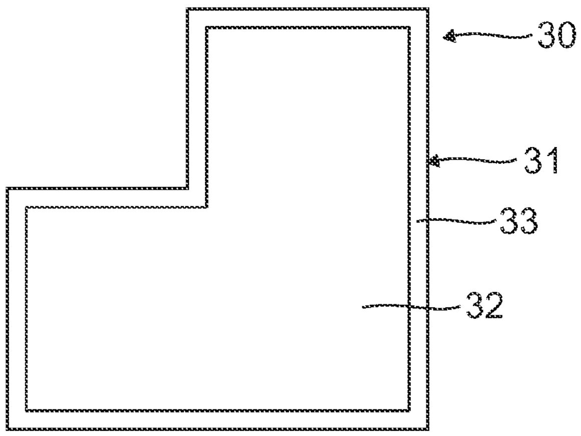
FIG. 6 illustrates an insulator device having an outer shell as outer shape.
Figure 7:
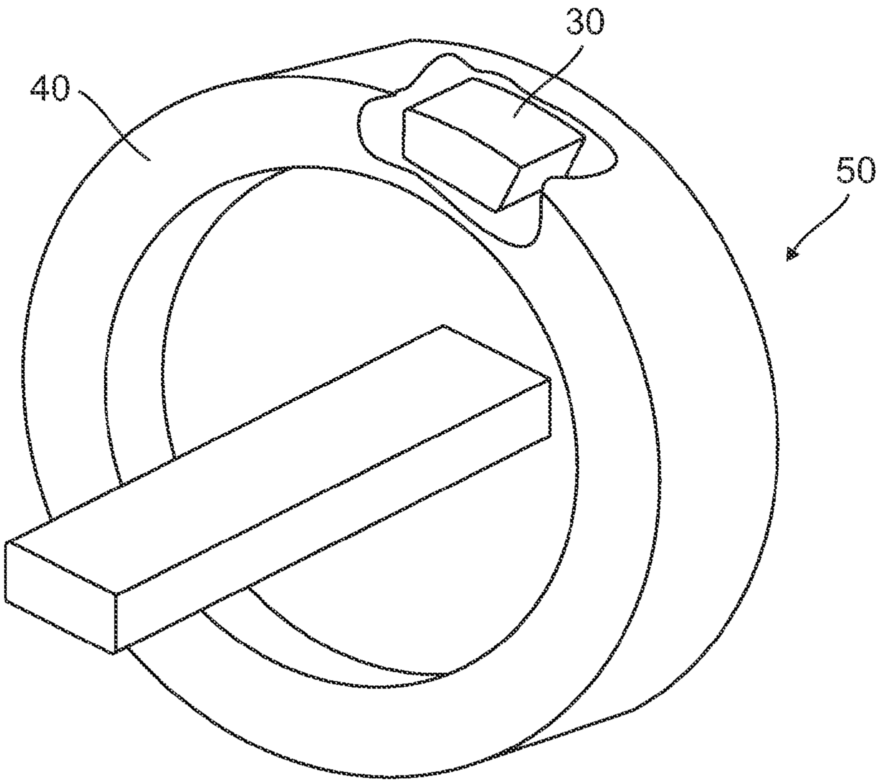
FIG. 7 illustrates an computer tomography device.

FIG. 6 illustrates an insulator device which outer shape is given by an outer shell forming a cavity, which cavity is filled with the insulator material. This insulator material may comprise a fluid or gaseous matrix material or could be vacuum too, so that the outer shell also provides the required shape of the total insulator, however, the filled in insulator material may also be solid, for example, if the respective matrix material of the insulator material is not vacuum tight.

As a matter of fact, the outer shell 33 may not only serve as the outer shape 31 of the insulator, but may also serve as a form into which a fluid insulator material may be filled in, in order to get solidified, like, for example, epoxy resin and/or polyester resin and corresponding hardener component or silicone to be cross linked. Thus, the cavity 32 of the insulator device 30 is used as a cast form. It should be understood, that the outer shell 33 may also be used as a form for an injection moulded insulator device.

The outer shell may be made of a vacuum tight material which is tight with respect to an outer air atmosphere, i.e. with respect to the molecules being present in an air atmosphere. The outer shell of the insulator device may also be made of an insulating material in case such an outer isolation is required. As a matter of fact, the outer shell may also be made of a conductive material in order to provide, for example, a reliable connection to ground potential and to provide a predetermined field distribution within the cavity of the insulator device.

The insulator device 30 may also be adapted to be used in a rotating gantry 40 of a computer tomography 50. For this purpose, the insulator device should be stable with respect to high acceleration due to radial centrifugal forces occurring during the operation of a rotating gantry of a computer tomography.

Figure 8:
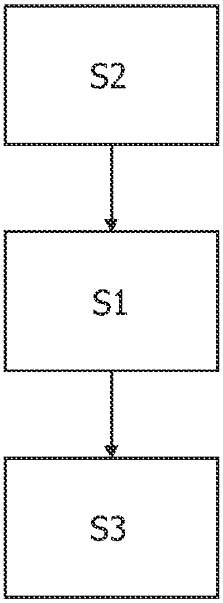
FIG. 8 illustrates a method according to an exemplary embodiment of the invention.
Figure 9:
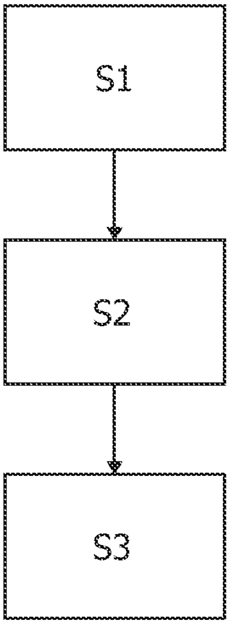
FIG. 9 illustrates a method according to a further exemplary embodiment of the invention.
Figure 10:
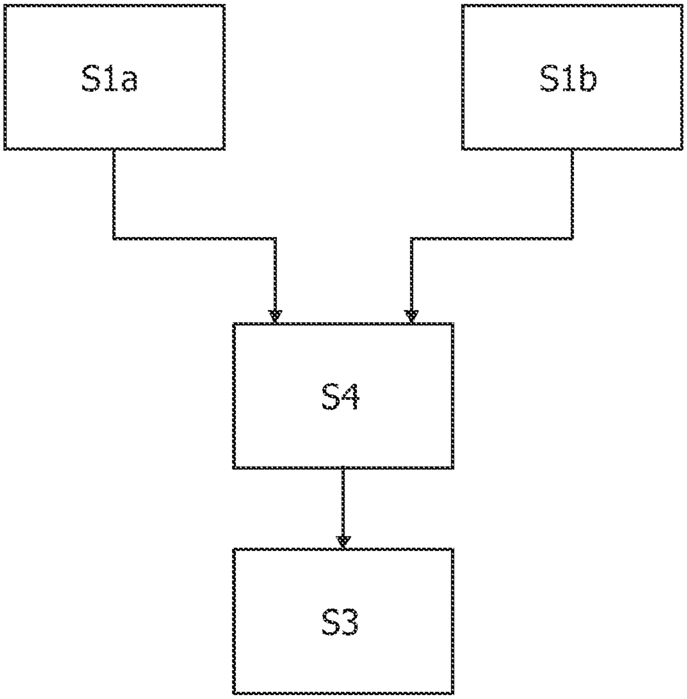
FIG. 10 illustrates a method according to another exemplary embodiment of the invention.

FIGS. 8, 9, 10 illustrate exemplary embodiments of the present invention.

The method for manufacturing an insulator material may comprise mixing S1 a matrix material 20 and a plurality of alveoles 10, which alveoles are evacuated at a pressure lower than the pressure which corresponds to the minimum of the Paschen law, or in particular at a pressure, which corresponds to a pressure representing a break down voltage twice of the breakdown voltage of the Paschen minimum. FIG. 8 illustrates an embodiment of the method, according to which the alveoles are evacuated S2 before being mixed with the matrix material. The alveoles may be alveoles having a wall enclosing a cavity, wherein the wall of the alveole comprises pores in the size allowing a gas molecule to pass from the inner to the outer of the alveole and hindering a polymer molecule to pass from the outer to the inner of the alveole. As a matter of fact, the alveoles may also be evacuated after being mixed with the matrix material by applying the vacuum to the mixture of the matrix material and the alveoles, as it is illustrated in FIG. 9. The applied vacuum causes the gas included in the alveoles to pass through the pores, so that the escaped gas rises within the matrix material as gas bubbles.

When evacuating the alveoles before being mixed with the matrix material, the alveoles may also be evacuated and kept under vacuum during the mixture process. Thus, the matrix material and the evacuated alveoles are both kept under vacuum before mixing the alveoles and the matrix material, which may avoid later gas bubbles and gas enclosures in the matrix material resulting from gas which has escaped from the alveoles during an evacuation process of already mixed alveoles and matrix material. In other words, the alveoles may, for example, be provided in a first tank to be evacuated, wherein the matrix material is kept under vacuum in a second tank, and after having evacuated the alveoles, the alveoles may be, for example, provided by a conduit from the first tank to the second tank, wherein the complete system of the first tank, the second tank and the connecting conduit should be vacuum tight. In general, the alveoles may kept separate from the matrix material until the alveoles are evacuated in order to mix the alveoles and the matrix material thereafter.

According to a further embodiment, a first quantity of the alveoles is mixed under vacuum S1*a* with an epoxy resin, and a second quantity of the alveoles is mixed under vacuum S1*b* with a corresponding hardener component before the epoxy resin and the corresponding hardener component are mixed S4. The hardening of the epoxy resin may take place at a pressure corresponding to the internal pressure of the evacuated alveoles. Thus, it may be avoided to destroy the vacuum condition in the alveoles and to close the pores of the alveoles by the hardened epoxy resin to arrive at a vacuum tight alveole. Further, the pressure under which the epoxy resin hardens is higher than a pressure at which components of the matrix material, i.e. the epoxy resin and/or the hardener component dissociate from each other. Instead of the epoxy resin also polyester resin and a corresponding hardener may be used. The same is valid for silicone and a corresponding cross linking agent to achieve a silicone rubber.

After the evacuation and mixing process, the mixture may be processed S3 by, for example, casting or injection moulding. The injection moulding process may be, for example, carried out under an atmosphere having a pressure corresponding to the internal pressure of the evacuated alveoles. This means that the complete mixture and injection moulding process including the cast into which the insulator material is injection moulded must be kept vacuum tight in order to stay within the appropriate ranges of the Paschen curve to maintain sufficient properties with respect to the breakdown voltage in gaseous spaces of the insulation material.

Using porous alveoles, for example, in form of hollow micro-spheres being porous with a diameter that gas molecules like air, N2, CO2, SO2 can pass through, but small enough that the polymer chains of a typical thermo setting material, e.g. epoxy resin and their hardener components, cannot pass through, an improved insulation material may be provided. By putting the alveoles, for example, in form of micro-spheres under vacuum before stirring under vacuum in an epoxy/hardener mixture, the pores of the alveoles may be closed in order to maintain the vacuum in the alveoles. By putting this mixture into a mould under vacuum, such a system leads to a solid insulated final end product to achieve a solid insulation material, which is filled with vacuum filled hollow alveoles in form of, for example, hollow micro-spheres. The result is a solid high voltage insulation material, which is filled with alveoles, wherein the alveoles are filled under and filled with, respectively, vacuum. Based on the Paschen law, a high and highest dielectric strength within the spheres or the alveoles may be achieved. The solid wall of the alveoles may be, for example, of glass or ceramic or a resin matrix, e.g. epoxy or other thermo setting or thermo plastic material, so that, for example, the wall of the alveoles and the matrix material may be of the same material.

Further, ordinary fillers like silica or other fillers may be used with the advantage of a very low weight and appropriate mechanical strength of the material.

As a further alternative pores may be provided in the wall having a size to allow SF6 (sulphur hexafluoride) molecules to pass, e.g. from the outer to the inner of the alveoles. The pressure may be between 1 bar and 10 bar, preferably 3 bar to 6 bar. Further, the alveoles may be mixed and/or stirred with a matrix material under the increased above pressure. When using epoxy resin or polyester resin and a corresponding hardener component, the hardening may also be carried out under said pressure. As a matter of fact, also any other kind of gas molecules (e.g. N2) may be used unless leading to a pressure and diameter with respect to the used gas molecules being higher than the pressure and diameter product of the minimum of the Paschen curve.

It should be noted that both, the evacuation of the alveoles or the filling of the alveoles with an appropriate isolation gas may lead to an increased breakdown voltage unless the product of pressure and diameter is higher or lower than the product of the pressure and the diameter corresponding to the minimum of the Paschen curve. In other words, both above options of the alveoles lead to an improved isolating material.

Further, it should be noted that the used materials for the alveoles and the matrix materials, as well as the states of aggregates and the package density may be the same like for the embodiments relating to the evacuated alveoles. The method steps for manufacturing an isolator material and an isolator device having embedded pressurized alveoles may be analogue to the steps for manufacturing an isolator material and an isolator device having embedded evacuated alveoles, wherein high pressure is applied instead of low pressure.

Further, it should be noted that the embodiments of the insulator device are also applicable for the use of pressurizes alveoles, wherein the vacuum tight shell may be replaced by a over pressure tight shell.

The invention can be, e.g. used in X-ray apparatus like computer tomography as well as other applications demanding a particular light weight insulating material having good dielectric properties, like, for example, in aircraft. The invention can also be used as a thermal insulator.

It should be noted that the term ‘comprising’ does not exclude other elements or steps and the ‘a’ or ‘an’ does not exclude a plurality. Also elements described in association with different embodiments may be combined.

It should be noted that the reference signs in the claims shall not be construed as limiting the scope of the claims.

The invention claimed is:

1. An alveole having a wall enclosing a cavity, wherein the wall of the alveole comprises pores in a size allowing a gas molecule selected from the group of N2, CO2, SO2 and SF6 to pass the wall of the alveole and hindering a polymer molecule to pass from the outer to the inner of the alveole, wherein the alveole has a diameter of from 5μ to 500 μm, and wherein the polymer molecule is selected from the group consisting of polyester resin, silicone rubber, silicone oil, and mineral oil.

2. The alveole of claim 1, wherein the wall of the alveole is formed of a material selected from the group consisting of glass, ceramic, phenolic resin and acrylonitrile copolymer.

3. The alveole of claim 1, wherein the alveole has a shape substantially in the form of a sphere or ellipsoid.

4. An insulator material comprising a matrix material and a plurality of alveoles according to claim 1, wherein the matrix material comprises the polymer molecules, and wherein the alveoles are evacuated at a pressure lower than the pressure which corresponds to the minimum of the Paschen law.

5. The insulator material of claim 4, wherein the pressure is equal or lower than the pressure which corresponds to the pressure in the Paschen law expressing a breakdown voltage which is twice of the breakdown voltage of the minimum of the Paschen law.

6. The insulator material of claim 4, wherein the pressure is between 5×10 exp (−1) mbar and 5×10 exp (−2) mbar.

7. The insulator material of claim 4, wherein the pressure is higher than the vapour pressure of the matrix material.

8. The insulator material of claim 4, wherein the pressure is equal or lower than the pressure which corresponds to the pressure in the Paschen law expressing the breakdown voltage which corresponds to the breakdown voltage of the matrix material.

9. The insulator material of claim 4, wherein the insulation material is a fluid.

10. The insulator material of claim 4, wherein the insulation material is solid.

11. The insulator material of claim 4, wherein the volume ratio between the alveoles and the insulator material is in the range of 40% to 74%.

12. The insulator material of claim 4, wherein the pressure is between 1 bar and 10 bar.

13. The insulator material of claim 4, wherein the pressure is equal or higher than the pressure which corresponds to the pressure in the Paschen law expressing the breakdown voltage of the matrix material.

* * * * *